Patented Dec. 8, 1931

1,835,619

UNITED STATES PATENT OFFICE

JAMES F. WALSH, OF EAST ORANGE, AND AMERIGO F. CAPRIO, OF NEWARK, NEW JERSEY, ASSIGNORS TO CELLULOID CORPORATION, A CORPORATION OF NEW JERSEY

METHOD OF UNITING ARTICLES

No Drawing.   Application filed March 23, 1928.   Serial No. 264,273.

This invention relates to the method of uniting articles by means of compositions containing vinyl compounds.

An object of our invention is to unite articles or sheets by means of liquids or plastic masses containing vinyl compounds.

A further object of our invention is to prepare lenses or laminated glass by the use of vinyl compounds. Other objects of our invention will appear from the following detailed description.

As is well known, when vinyl compounds are exposed to light and/or heat, and particularly to ultra violet light, either in the absence or presence of catalytic material, such as uranium salts, carbon tetrachloride, benzoyl peroxide and the like, they become polymerized and form products that vary in consistency from viscous liquids to difficultly soluble semisolids or solids, depending on the time and rapidity of the polymerization.

We have found that when unpolymerized vinyl compounds, or partially polymerized vinyl compounds are applied to surfaces, and then are further polymerized, they form hard, firmly adherent and transparent films or layers.

In accordance with our invention, articles or sheets of various natures may be united by the application of a liquid or plastic material containing vinyl compounds, and the articles or sheets with the layer or film of the material containing the vinyl compounds are exposed under such conditions as to form hard and firmly adhering unions between the sheets or articles to be united.

Any suitable vinyl compound, that is, a compound having the group $CH_2=CH$ therein, may be used in our invention. Of the vinyl compounds that may be used, we prefer the vinyl acetate, but it is to be understood that other vinyl compounds such as the compound formed by the dehalogenating of a vinyl halide (say vinyl chloride) by means of zinc dust, vinyl propionate, vinyl phosphate, vinyl phthalate, vinyl chloride, vinyl bromide, styrene $(C_6H_5CH=CH_2)$ which is vinyl benzene, or its compounds, etc. may be used.

The vinyl compounds may be used in the unpolymerized state, either alone or in solution, as a cement, and after application between the sheets or articles to be united, may be polymerized by light with or without heat and/or catalysts, such as uranium salts, carbon tetrachloride or benzoyl peroxide.

However, we prefer to use as the cement, a partially polymerized vinyl compound, preferably polymerized to such an extent that it has the consistency of a jelly. This cement may consist solely of one or more polymerized vinyl compounds, or it may comprise one or more polymerized vinyl compounds and other materials such as solvents, solids, etc.

When partially polymerized products are used, the sheets or articles with a layer of the material containing the partially polymerized vinyl compounds, are pressed and exposed to light and/or heat to further polymerize the vinyl compounds to form hard, firmly adherent and transparent layers.

If desired, filling materials, effect materials, pigments, dyes, etc. may be added to the solution or plastic masses containing the unpolymerized or partially polymerized vinyl compounds in any amounts to produce any artistic or other effect that may be desired.

The vinyl compounds, either prior to their application to the sheets or articles to be united or subsequent thereto, or both prior and subsequent to their application, may be polymerized by sunlight, by ultra violet light such as is emitted from a mercury vapor lamp, or in any other suitable manner. Catalytic assistants such as uranium salts, carbon tetrachloride, benzoyl peroxide, etc. may also be employed, although their use is not required for polymerizing many vinyl compounds, e. g. vinyl acetate. Heat may be employed to accelerate the polymerization of the vinyl compounds while they are exposed to light, or after initiation of the polymerization, the source of light may be removed and polymerization caused to proceed solely by the use of heat. When the cement that is applied to the sheets or articles contains partially polymerized vinyl compounds, the completion of the polymerization may be accomplished by merely heating the articles, with or without pressure.

The compositions consisting of or containing vinyl compound may be used for uniting articles of any desired shape or form, such as sheets, plates, slabs, blocks, rods, bricks, or of any of the complicated shapes of finished articles of any size. The articles to be joined may be of wood, metal, stone, brick, ceramic material, rubber, celluloid, natural or artificial resins, glass, cardboard, paper, leather or fabrics of all kinds such as cotton, silk, wool, etc.

However, because of the transparency, hardness, and firm adherence of the polymerized vinyl compounds, their use for uniting glass such as in lens making, and particularly for making laminated glass, is of great interest.

For the making of laminated glass, in one form of our invention, two or more sheets of glass are united by applying between them a layer of material containing either unpolymerized or partially polymerized vinyl compounds, and the polymerization allowed to proceed as described above. If the layer containing vinyl compounds is sufficiently thick, a shatterless glass is formed.

In another form of our invention, one or more sheets containing cellulose derivatives are coated by means of two or more layers or films of a material containing the vinyl compounds, and then placed between two or more sheets of glass, whereupon the vinyl compounds are caused to polymerize to cause firm adherence of the cellulose derivative sheets to the sheets of glass in any of the manners set forth above, thus forming clear, transparent and firmly stuck laminated glass, that is shatterless, and therefore highly adapted for use in automobiles and other vehicles or places, where the exigencies of safety require the use of such shatterless glass. Of the cellulose derivatives that may be used, the cellulose nitrate, and organic derivatives of cellulose such as organic esters of cellulose and cellulose ethers may be mentioned. Examples of organic esters of cellulose are cellulose acetate, cellulose formate, cellulose propionate, cellulose butyrate; examples of cellulose ethers are methyl cellulose, ethyl cellulose, benzyl cellulose. However, we prefer to use cellulose acetate.

It is to be understood that the foregoing detailed description is given merely by way of illustration and that many variations may be made therein without departing from the spirit of this invention.

Having described our invention what we claim and desire to secure by Letters Patent is:

1. Method of uniting articles comprising applying a layer of a material containing a vinyl compound between the surfaces thereof, subjecting the same to pressure and polymerizing said vinyl compound in situ.

2. Method in accordance with claim 1 wherein the vinyl compound is a vinyl acetate.

3. Method of uniting articles comprising applying a layer of a material containing a partially polymerized vinyl compound between the surfaces thereof, subjecting the same to pressure and further polymerizing said vinyl compound in situ.

4. Method in accordance with claim 3 wherein the vinyl compound is a vinyl acetate.

5. Method of uniting articles of glass comprising applying a layer of a material containing a vinyl compound between the surfaces thereof, subjecting the same to pressure and polymerizing said vinyl compound in situ.

6. Method in accordance with claim 5 wherein the vinyl compound is a vinyl acetate.

7. Method in accordance with claim 5 wherein the polymerization is effected by the action of light.

8. Method of making laminated glass comprising securing a sheet containing a derivative of cellulose between sheets of glass by applying a layer of a material containing a vinyl compound between said cellulose derivative and said sheets of glass, subjecting the same to pressure and polymerizing said vinyl compound in situ.

9. Method in accordance with claim 8 wherein the cellulose derivative is an organic derivative of cellulose.

10. Method in accordance with claim 8 wherein the cellulose derivative is cellulose acetate.

11. Method in accordance with claim 8 wherein the vinyl compound is vinyl acetate.

In testimony whereof, we have hereunto subscribed our names.

JAMES F. WALSH.
AMERIGO F. CAPRIO.